(12) United States Patent
Nakashima

(10) Patent No.: US 11,073,203 B2
(45) Date of Patent: Jul. 27, 2021

(54) POWER TOOL

(71) Applicant: MAKITA CORPORATION, Anjo (JP)

(72) Inventor: Tatsuo Nakashima, Anjo (JP)

(73) Assignee: MAKITA CORPORATION, Anjo (JP)

( * ) Notice: Subject to any disclaimer, the term of this patent is extended or adjusted under 35 U.S.C. 154(b) by 6 days.

(21) Appl. No.: 16/704,119

(22) Filed: Dec. 5, 2019

(65) Prior Publication Data

US 2020/0217412 A1    Jul. 9, 2020

(30) Foreign Application Priority Data

Jan. 9, 2019 (JP) .............................. JP2019-002071

(51) Int. Cl.
| | |
|---|---|
| B25B 21/00 | (2006.01) |
| F16H 57/08 | (2006.01) |
| F02N 15/04 | (2006.01) |
| B25B 21/02 | (2006.01) |
| F16H 1/46 | (2006.01) |

(52) U.S. Cl.
CPC ........... *F16H 57/082* (2013.01); *B25B 21/02* (2013.01); *F02N 15/046* (2013.01); *B25B 21/00* (2013.01); *F16C 2361/61* (2013.01); *F16H 1/46* (2013.01); *F16H 2057/085* (2013.01)

(58) Field of Classification Search
None
See application file for complete search history.

(56) References Cited

U.S. PATENT DOCUMENTS

| | | | |
|---|---|---|---|
| 7,182,709 B2* | 2/2007 | Christ | F16H 1/28 475/331 |
| 9,314,908 B2* | 4/2016 | Tanimoto | B25B 21/02 |
| 10,668,602 B2* | 6/2020 | Ishibashi | B25B 21/02 |
| 10,920,733 B2* | 2/2021 | Fliearman | F16H 57/031 |

FOREIGN PATENT DOCUMENTS

JP        2016-097498 A        5/2016

\* cited by examiner

*Primary Examiner* — Leslie A Nicholson, III
(74) *Attorney, Agent, or Firm* — Oliff PLC

(57) ABSTRACT

A spindle is radially and axially compact. An impact wrench includes a motor, a sun gear rotatable by the motor, a planetary gear meshing with the sun gear, an internal gear meshing with the planetary gear, a gear case holding the internal gear, a spindle holding the planetary gear, and a first bearing located between the gear case and the spindle, and supporting the spindle on an outer circumference and the gear case on an inner circumference.

9 Claims, 11 Drawing Sheets

US 11,073,203 B2

POWER TOOL

CROSS-REFERENCE TO RELATED APPLICATIONS

This application claims the benefit of priority to Japanese Patent Application No. 2019-002071, filed on Jan. 9, 2019, the entire contents of which are hereby incorporated by reference.

BACKGROUND

1. Technical Field

The present invention relates to a power tool such as an impact driver and an impact wrench.

2. Description of the Background

Power tools such as impact drivers and impact wrenches each include a motor and an output shaft such as a spindle or an anvil. When the motor is driven, the output shaft rotates to perform operations such as tightening screws or nuts.

For an impact wrench described in Japanese Unexamined Patent Application Publication No. 2016-97498, a spindle accommodated in a case has its front end coaxially held by a rear end of an anvil, and its rear end including a carrier held at its outer circumference with a bearing held inside a rear portion of the case.

BRIEF SUMMARY

For such a known power tool, the rear end of the spindle may be held by a bearing on its outer circumference, and the bearing becomes large. Thus, the entire tool cannot be radially more compact. When an internal gear is arranged outside a planetary gear supported by a carrier, the bearing is to be arranged behind the internal gear to avoid interference with the internal gear. This also increases the axial dimension of the spindle. Thus, the entire tool cannot be axially more compact.

One or more aspects of the present invention are directed to a power tool that is radially compact by allowing use of a smaller bearing on a spindle.

A first aspect of the present invention provides a power tool, including:
 a motor;
 a sun gear rotatable by the motor;
 a planetary gear meshing with the sun gear;
 an internal gear meshing with the planetary gear;
 a gear case holding the internal gear;
 a spindle holding the planetary gear; and
 a first bearing located between the gear case and the spindle and supporting the spindle on an outer circumference and the gear case on an inner circumference.

A second aspect of the present invention provides a power tool, including:
 a motor;
 a sun gear rotatable by the motor;
 a planetary gear meshing with the sun gear;
 an internal gear meshing with the planetary gear;
 a gear case holding the internal gear;
 a spindle holding the planetary gear; and
 a bearing holding the spindle,
wherein the spindle has a plurality of protruding portions protruding toward the bearing, and the bearing is located inside the plurality of protruding portions.

The power tool according to the aspects of the present invention is radially compact by allowing use of a smaller bearing.

DETAILED DESCRIPTION

Embodiments of the present invention will now be described below with reference to the drawings.

Figure 1:
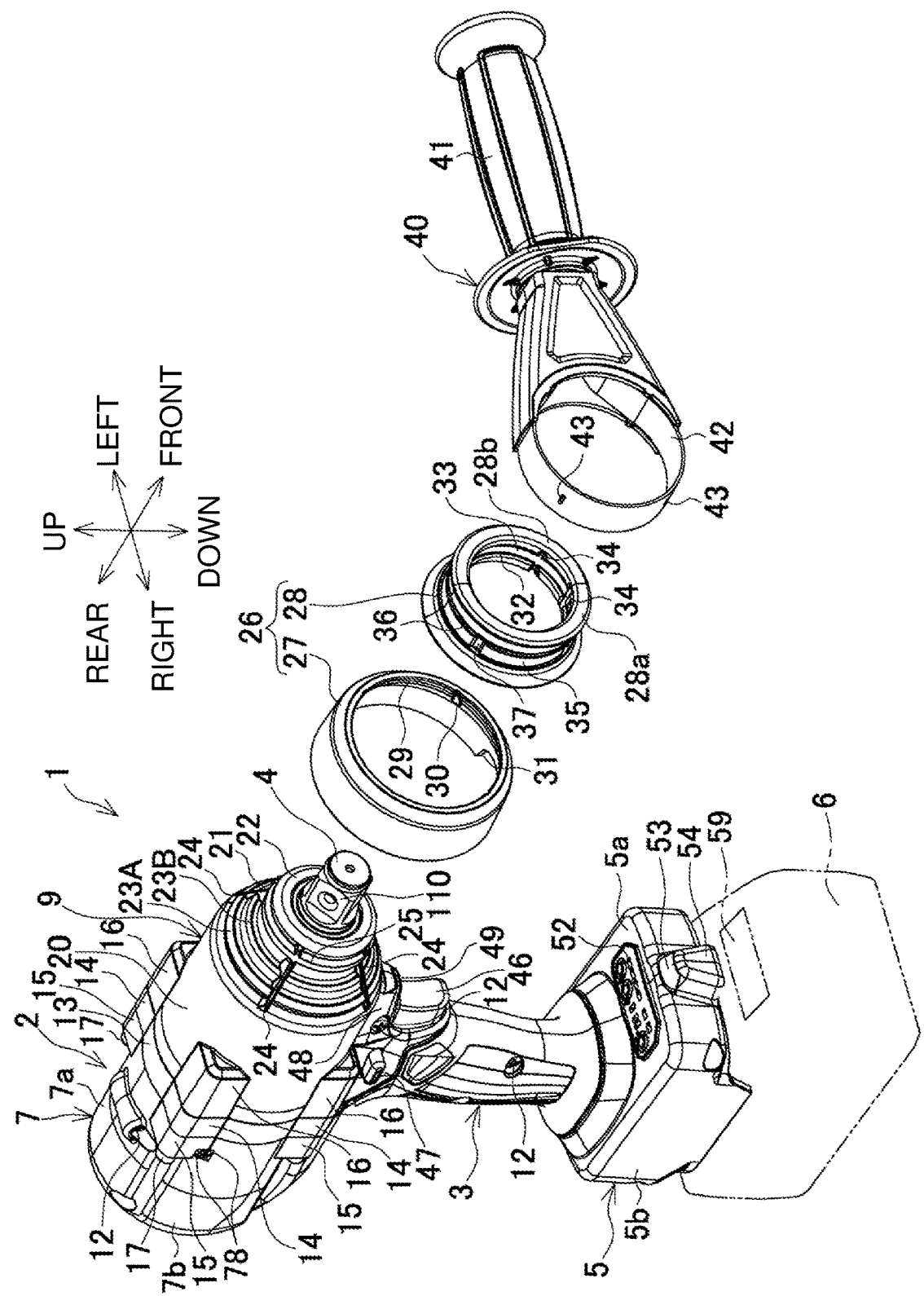
FIG. 1 is an exploded perspective view of an impact wrench, a cover, and a side handle.
Figure 2:
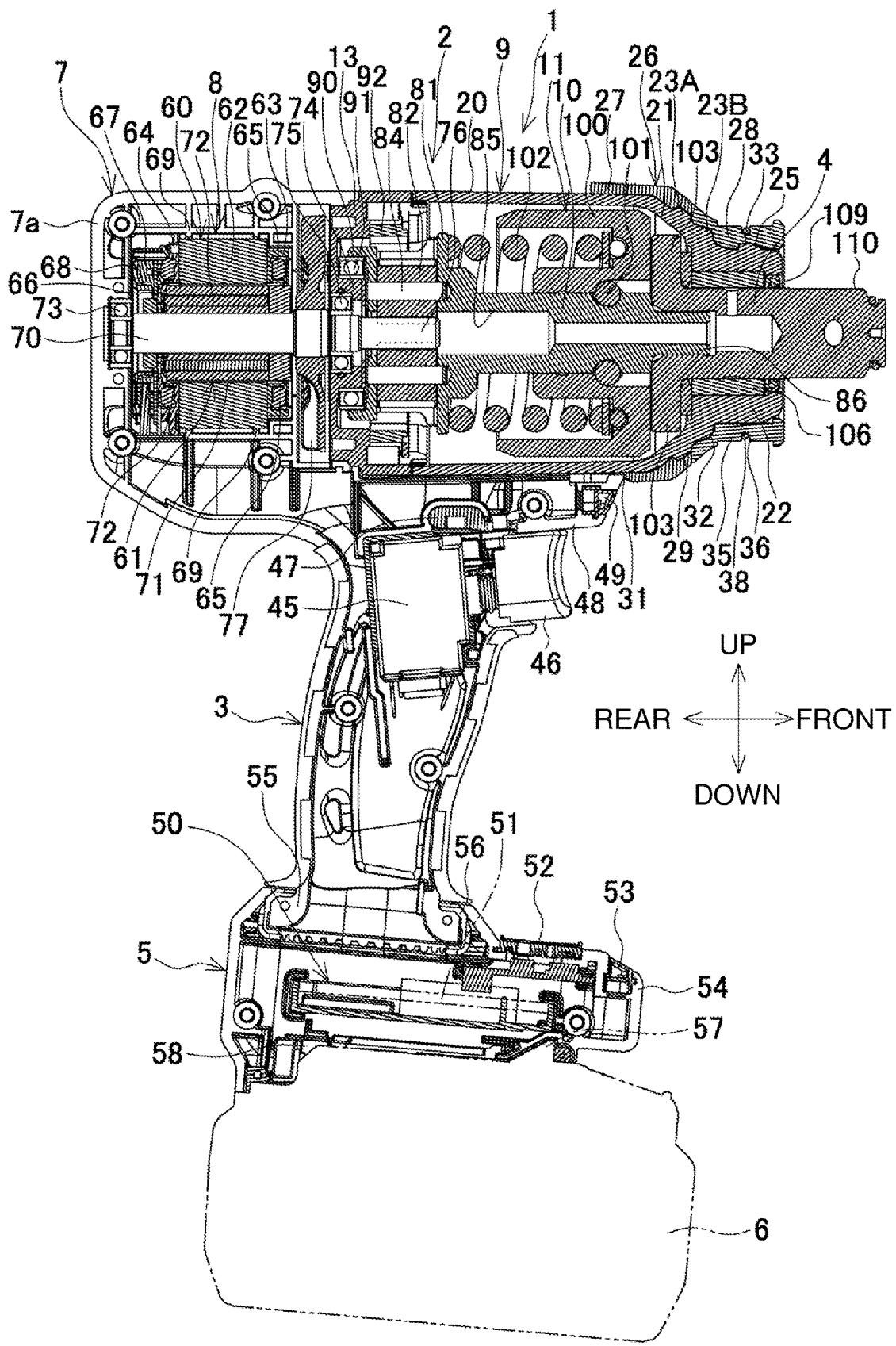
FIG. 2 is a longitudinal central sectional view of the impact wrench.

FIG. 1 is an exploded perspective view of an impact wrench as an example of a power tool, a cover, and a side handle. FIG. 2 is a longitudinal central sectional view of the impact wrench.

An impact wrench 1 includes a body 2 and a handle 3. The body 2 extends in the front-rear direction. The handle 3 extends in the up-down direction. The impact wrench 1 is T-shaped as viewed laterally. An anvil 4 serving as an output shaft protrudes from a leading end of the body 2. A battery mount 5 is located at the lower end of the handle 3. The battery mount 5 receives a battery pack 6, which serves as a power supply.

A housing for the body 2 includes a body housing 7 formed from a synthetic resin, and a metal hammer case 9. The body housing 7 accommodates a brushless motor 8 in its rear portion. The handle 3 extends from lower portion of the body housing 7. The hammer case 9 is attached in front of the body housing 7 to accommodate a spindle 10 and a striking mechanism 11. The body housing 7 is assembled by fastening a pair of right and left half housings 7a and 7b with screws 12 extending in right-left direction.

Figure 4:
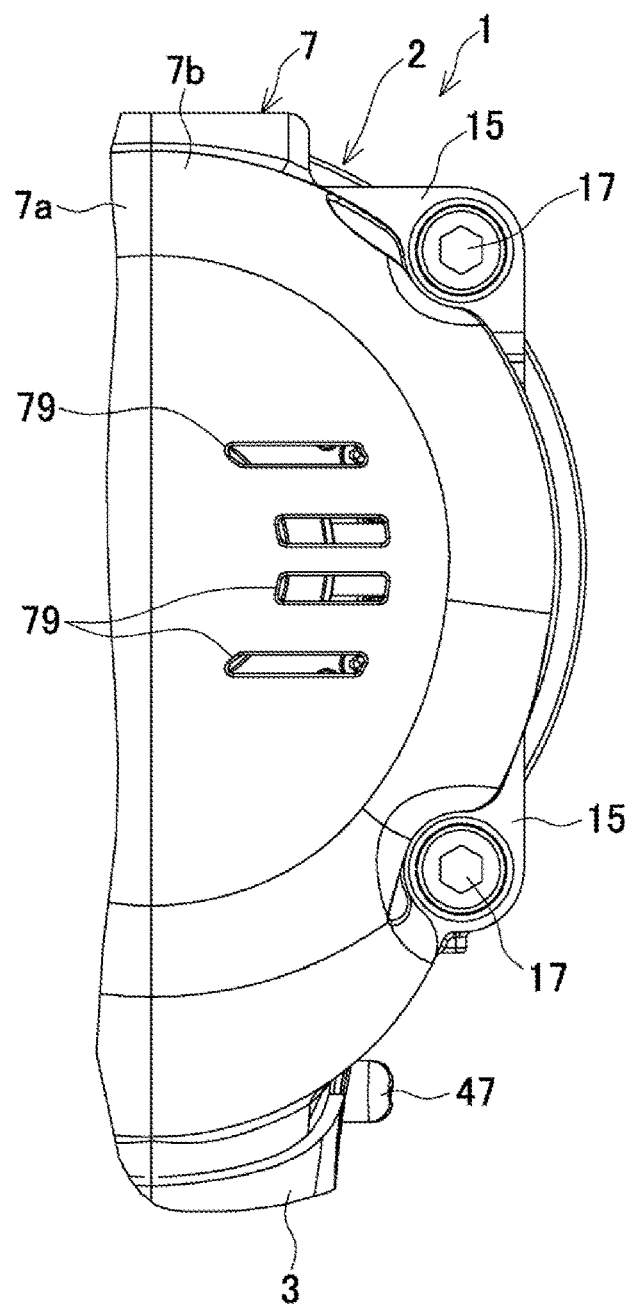
FIG. 4 is a partial rear view of an impact wrench body.
Figure 5A:
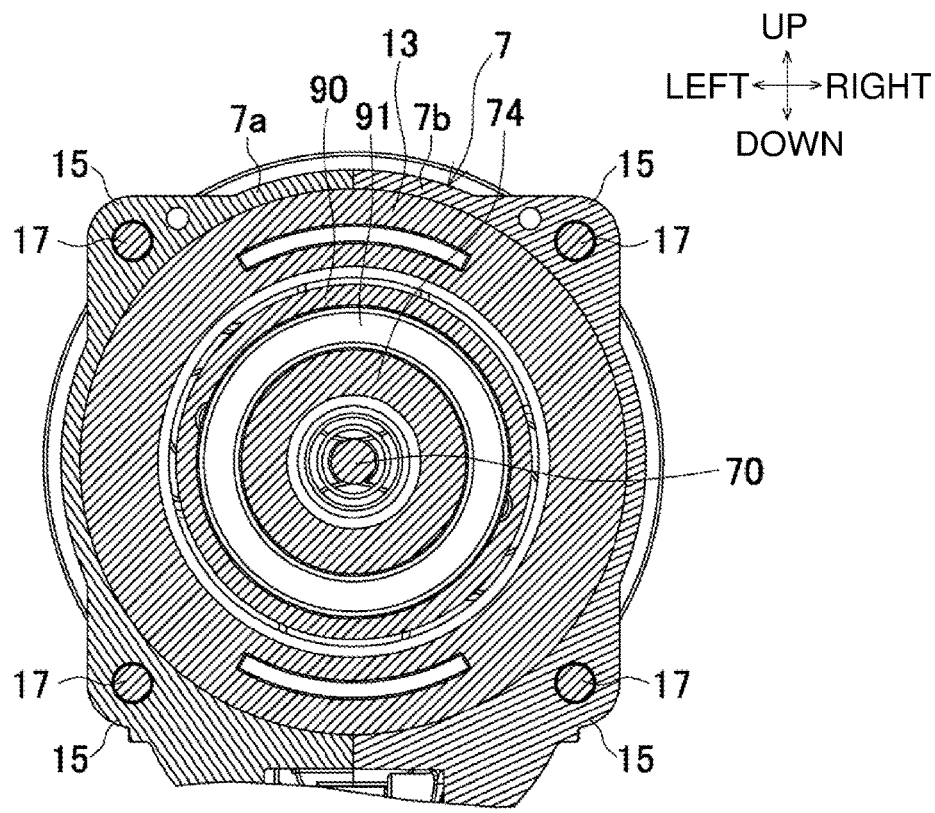
FIG. 5A is a cross-sectional view taken along line A-A in FIG. 3.
Figure 5B:
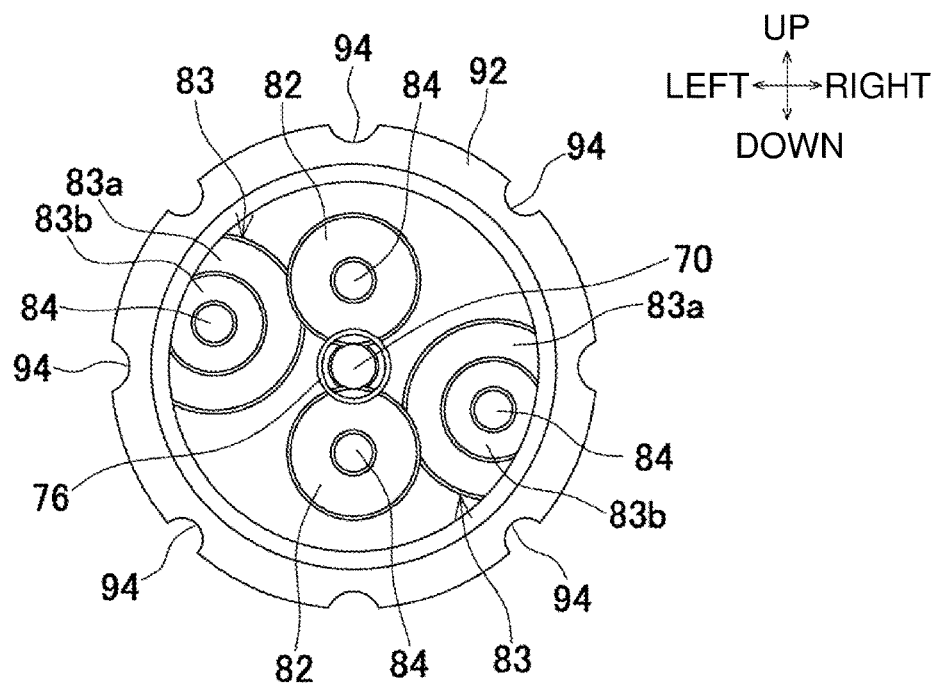
FIG. 5B is a view of planetary gears taken along the same section in the direction indicated by arrows.

The body housing 7 contains a metal gear case 13 behind the hammer case 9. The gear case 13 protrudes rearward, and is fitted with a rear end of the hammer case 9. The gear case 13 has four ribs 14 circumferentially protruding at upper-right, upper-left, lower-right, and lower-left positions on its outer periphery. Behind the ribs 14, rear bosses 15 are located on the outer periphery of the front end of the body housing 7. In front of the ribs 14, front bosses 16 are located on the outer periphery of the rear end of the hammer case 9. As shown in FIGS. 1 and 4, the front bosses 16 receive bolts 17 screwed from the rear through the rear bosses 15 and the ribs 14, fastening the body housing 7, the gear case 13, and the hammer case 9 together. In this manner, the metal hammer case 9 receives the bolts 17, which firmly join the body housing 7 and the hammer case 9 together and improve durability.

The hammer case 9 is cylindrical, and includes a case body 20, a tapered portion 21, and a front cylinder 22. The case body 20 has a gradually decreasing diameter from a rear end toward the front. The tapered portion 21 is continuous with the front of the case body 20. The tapered portion 21 is tapered and has a diameter gradually decreasing with a greater inclination than the case body 20. The front cylinder 22 is continuous with the front of the tapered portion 21. The front cylinder 22 has a uniform diameter in the front-rear direction. The tapered portion 21 has two concentrically protruding ring-shaped rear stoppers 23A and 23B on its outer circumference. The tapered portion 21 also has four radial ribs 24 extending in the radial direction of the tapered portion 21 as viewed from the front at circumferentially equal intervals on its outer circumference. The radial ribs 24 are higher than the rear stoppers 23A and 23B.

The front cylinder 22 has a ring-shaped front stopper 25 in the middle of the outer circumference in the front-rear direction.

A cover 26 is externally mounted to the hammer case 9 from the front. The cover 26 is dividable into a rear first cover 27 and a front second cover 28.

Figure 3:
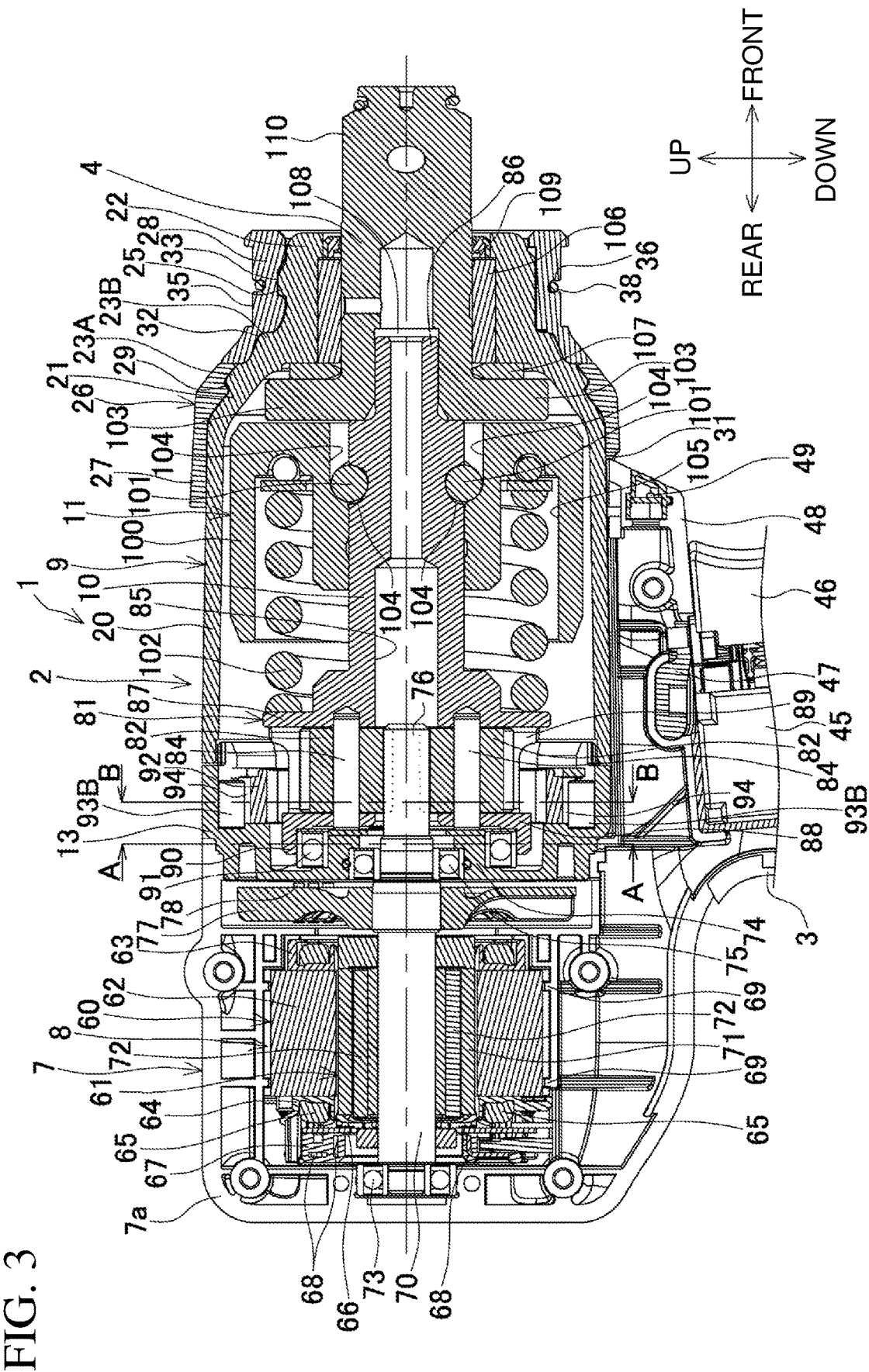
FIG. 3 is an enlarged sectional view of a body in FIG. 2.

The first cover 27 is formed from rubber, and is externally mounted to cover a front end of the case body 20 and a rear half of the tapered portion 21. As shown in FIG. 3, the first cover 27 has, on its inner circumference at the front end, a ring-shaped engagement groove 29 that is engaged with the rear stopper 23A. The first cover 27 has four rear axial grooves 30 on its inner circumference. The front ends of the rear axial grooves 30 communicate with the engagement groove 29. Each rear axial groove 30 is engaged with the corresponding radial rib 24. The first cover 27 has a cutout 31 on its lower portion. The cutout 31 prevents interference with an extension 48 (described later) located on the handle 3.

The second cover 28 is formed from a resin, and is externally mounted to cover a front half of the tapered portion 21 and the front cylinder 22. The second cover 28 includes a pair of half rings 28a and 28b dividable into right and left parts that are joined together with a ring spring 38 (described later). The second cover 28 has, on its inner circumference at the rear end, a ring-shaped rear positioning groove 32, which is engaged with the rear stopper 23B. A ring-shaped front positioning groove 33, which is engaged with the front stopper 25 on the front cylinder 22, is formed in front of the rear positioning groove 32. The second cover 28 has four front axial grooves 34 on its inner circumference. Each front axial groove 34 communicates with the positioning grooves 32 and 33, and is engaged with the corresponding radial rib 24 on the tapered portion 21. The second cover 28 has, on its outer circumference, a fitting groove 35 to receive a side handle 40. The fitting groove 35 has a ring-shaped recessed groove 36 and four recesses 37 at circumferentially equal intervals. The ring spring 38 is externally mounted on the recessed groove 36.

The first cover 27 is externally mounted to cover the case body 20 and the rear half of the tapered portion 21 with the cutout 31 facing downward and the rear axial grooves 30 aligned with the radial ribs 24 on the tapered portion 21. The engagement groove 29 is positioned through engagement with the rear stopper 23A.

The second cover 28 is then externally mounted to cover the front half of the tapered portion 21 and the front cylinder 22 with the half rings 28a and 28b open laterally against the urging force from the ring spring 38. The half rings 28a and 28b are then joined with the ring spring 38 again. When the front axial grooves 34 are aligned with the radial ribs 24, the rear positioning groove 32 is positioned through engagement with the rear stopper 23B and the front positioning groove 33 is positioned through engagement with the front stopper 25, and the second cover 28 is fixed to the front cylinder 22. In this state, the front end of the first cover 27 comes in contact with the rear end of the second cover 28, and is prevented from slipping frontward.

The side handle 40, which is detachable from the front cylinder 22, is attached to the front cylinder 22 with the second cover 28 being attached to the front cylinder 22. The side handle 40 includes a linear grip 41 and a clamp 42. The clamp 42 is a strip plate shaped into a ring and protrudes along the extension of the grip 41 in an expansible and contractible manner. The clamp 42 has a plurality of protrusions 43 protruding inwardly on the inner surface. Each protrusion 43 corresponds to the recess 37 on the second cover 28.

The expanded clamp 42 is externally mounted on the fitting groove 35 on the second cover 28, and then is contracted with the protrusions 43 aligned with the recesses 37. The side handle 40 is thus attached to the front cylinder 22 with the clamp 42 clamping the front cylinder 22 with the second cover 28 in between, and thus the grip 41 protrudes sideward from the front cylinder 22.

The side handle 40 can be attached with the second cover 28 being attached, without the need to remove the second cover 28.

The handle 3 has a switch 45 and a forward/reverse switch button 47 in its upper portion. The switch 45 has a trigger 46 protruding frontward. The forward/reverse switch button 47 switches the rotation of the brushless motor 8. The body housing 7 has the extension 48 above the trigger 46. The extension 48 covers the lower surface of the hammer case 9 and extends more frontward than the trigger 46. The extension 48 has, on its distal end, a light source 49 including a light-emitting diode (LED) for illuminating the front of the anvil 4.

The battery mount 5 accommodates a controller 50 including a control circuit board 51. The control circuit board 51 includes, for example, a switching element and a microcomputer for controlling the brushless motor 8. The control circuit board 51 includes a switch panel 52 having, for example, a button for selecting a striking force and a lamp for indicating the remaining battery capacity. The switch panel 52 is exposed on the front upper surface of the battery mount 5. In front of the switch panel 52, a projecting portion 54 is located at the front end of the battery mount 5. The projecting portion 54 accommodates a second light source 53 including an LED and facing upward.

The lower portion of the handle 3 and the battery mount 5 are connected to each other by joining and fastening, with screws, right and left half parts 5a and 5b. The right and left half parts 5a and 5b form the battery mount 5 to a joint 55 protruding from the lower end of the handle 3. An elastic material 56 is arranged between the joint 55 and the battery mount 5 to reduce shock and vibration propagating from the handle 3 to the battery mount 5.

The battery pack 6 is slid onto the battery mount 5 from the front and connected to the battery mount 5 with rails fitting each other and a hook 57 engaged with the battery mount 5. When the battery pack 6 is connected to the battery mount 5, terminals on a terminal mount 58 included in the battery mount 5 are electrically connected to terminals on the battery pack 6 below the controller 50. A disengagement button 59 is located below the projecting portion 54. The disengagement button 59 switches the hook 57 in a disengagement state when the battery pack 6 is removed.

The body 2 includes the brushless motor 8, the spindle 10, the striking mechanism 11, and the anvil 4 in this order from the rear.

The brushless motor 8 is an inner-rotor motor including a stator 60 and a rotor 61 located in the stator 60. The stator 60 includes a cylindrical stator core 62, a front insulator 63, a rear insulator 64, and six coils 65. The stator core 62 is formed by stacking multiple steel plates. The front insulator 63 is arranged on the axially front end face of the stator core 62, and the rear insulator 64 is arranged on the axially rear end face of the stator core 62. The six coils 65 are wound around the stator core 62 via the front and rear insulators 63 and 64. A sensor circuit board 66 and a short-circuiting member 67 are joined to the rear insulator 64. The sensor circuit board 66 has three rotation detecting elements (not shown) to detect the positions of permanent magnets 72 on the rotor 61 and to output a rotational detection signal. The short-circuiting member 67 is formed by insert molding three metal sheets 68. The three metal sheets 68 short-circuit fuse terminals, which are to be fused to wires between the coils 65, located diagonally from each other. The six coils 65 are wound in parallel and delta-connected using the short-circuiting member 67.

The stator 60 is held, on its outer circumference, by the support ribs 69 each circumferentially protruding inward from the inner surfaces of the half housings 7a and 7b of the body housing 7. The half housings 7a and 7b have, on their inner surfaces, projections (not shown) fitted with recesses (not shown) located on the side surface of the rear insulator 64.

The rotor 61 includes a rotational shaft 70 aligned with its axis, a rotor core 71, and the four plate-like permanent magnets 72. The rotor core 71, which is substantially cylindrical, surrounds the rotational shaft 70, and is formed by stacking multiple steel plates. The permanent magnets 72 are fixed inside the rotor core 71. The rear end of the rotational shaft 70 is axially supported by a bearing 73 held in a rear portion of the body housing 7. The front end of the rotational shaft 70 is axially supported by a bearing 75 held by a bearing holder 74 in the gear case 13. A sun gear 76 is formed at the front end of the rotational shaft 70. The front end of the rotational shaft 70 protrudes frontward from the gear case 13. The rotational shaft 70 has a centrifugal fan 77 behind the bearing 75. The body housing 7 has air outlets 78 on its two lateral side surfaces at positions corresponding to the centrifugal fan 77. As shown in FIG. 4, the body housing 7 also has air inlets 79 on its rear surface.

A space defined by the hammer case 9 and the gear case 13 accommodates the spindle 10 and the striking mechanism 11. The spindle 10 is integral with a carrier 81 having a rear portion holding four planetary gears 82 and 83 (described later) with support pins 84. The spindle 10 has an axial blind hole 85 at its rear end. The spindle 10 includes a smaller-diameter portion 86 at its front end.

As shown in FIGS. 7A to 7D, the carrier 81 includes a front plate 87, which is disk-shaped, a rear plate 88, and four connectors 89. The rear plate 88 is located behind and parallel to the front plate 87. The connectors 89 connect the front plate 87 and the rear plate 88. The front end of the support pin 84 is supported by the front plate 87, and the rear end of the support pin 84 is supported by the rear plate 88. The support pins 84 hold the planetary gears 82 and 83. The rear plate 88 has, on its outer circumference, an outer support 90 having a diameter greater than the perimeter of the bearing holder 74 in the gear case 13. The outer support 90 protrudes rearward from the rear plate 88. The outer support 90 overlaps the bearing holder 74 in the radial direction of the spindle 10. A bearing 91 between the outer support 90 and the bearing holder 74 axially supports the rear end of the spindle 10 from inside. In this state, the bearing 91 is located outward from the bearing 75, and radially overlaps the bearing 75. The outer support 90 holds the bearing 91 along the entire periphery.

With the rear end of the spindle 10 supported by the bearing 91, the sun gear 76 on the rotational shaft 70 is inserted into the blind hole 85 from the rear. The front end of the spindle 10 is supported with the smaller-diameter portion 86 coaxially inserted into an insertion hole 108 extending along the axis of the anvil 4.

As shown in FIGS. 5A to 6B, the planetary gears 82 and 83 are located separately. On two large and small concentric circles about the axis of the spindle 10, the two planetary gears 82 are located on the inner small concentric circle, and the two planetary gears 83 are located on the outer large concentric circle. The inner planetary gears 82 mesh with the sun gear 76 on the rotational shaft 70.

The outer planetary gears 83 each have two stages and include a larger-diameter portion 83a and a smaller-diameter portion 83b. The larger-diameter portion 83a is located frontward and meshes with the inner planetary gear 82. The smaller-diameter portion 83b is coaxial with the larger-diameter portion 83a and located behind the larger-diameter portion 83a. The smaller-diameter portion 83b has a smaller diameter than the larger-diameter portion 83a. The larger-diameter portion 83a has a larger diameter and more teeth than the planetary gear 82, and meshes with the planetary gear 82. The smaller-diameter portion 83b has a smaller diameter and fewer teeth than the planetary gear 82, and meshes with an internal gear 92 held inside the gear case 13. As described above, the planetary gears 82 mesh with the sun gear 76, and the planetary gears 83 mesh with the internal gear 92, allowing double reduction with the single internal gear 92 and increasing the gear ratio without changing the size of the internal gear 92.

Figure 6A:
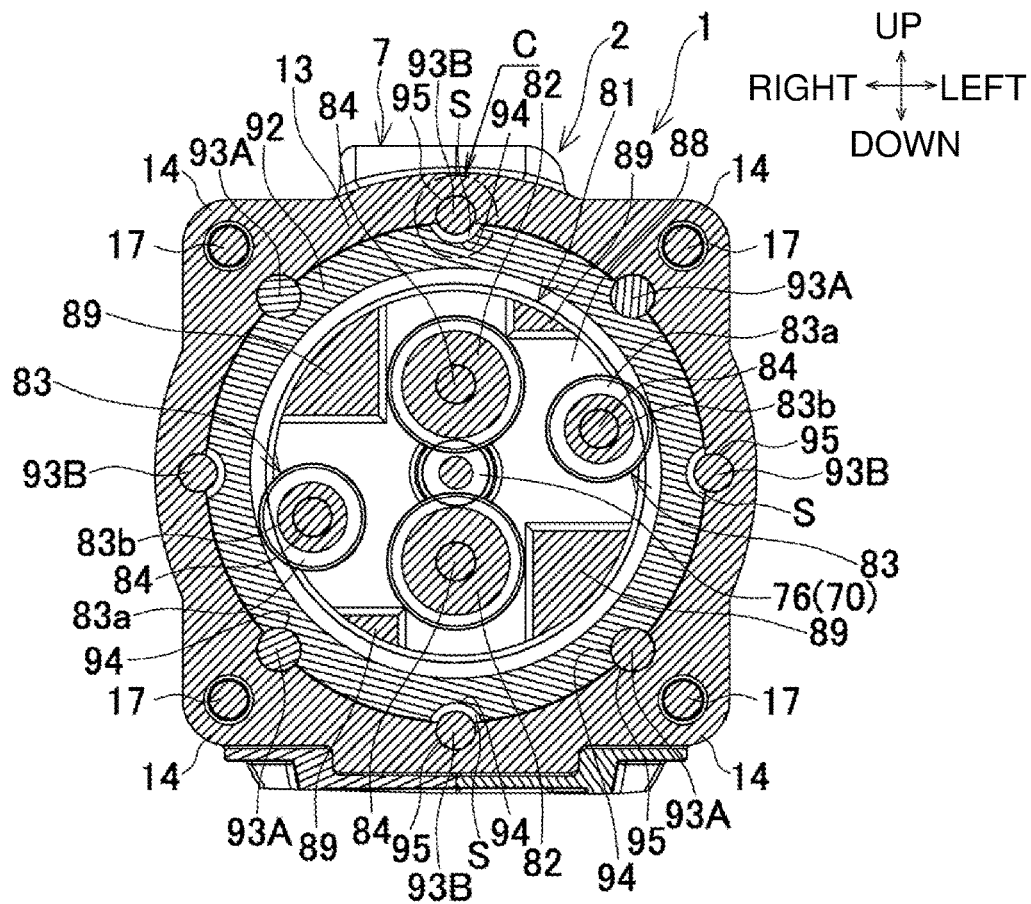
FIG. 6A is a cross-sectional view taken along line B-B in FIG. 3.
Figure 6B:
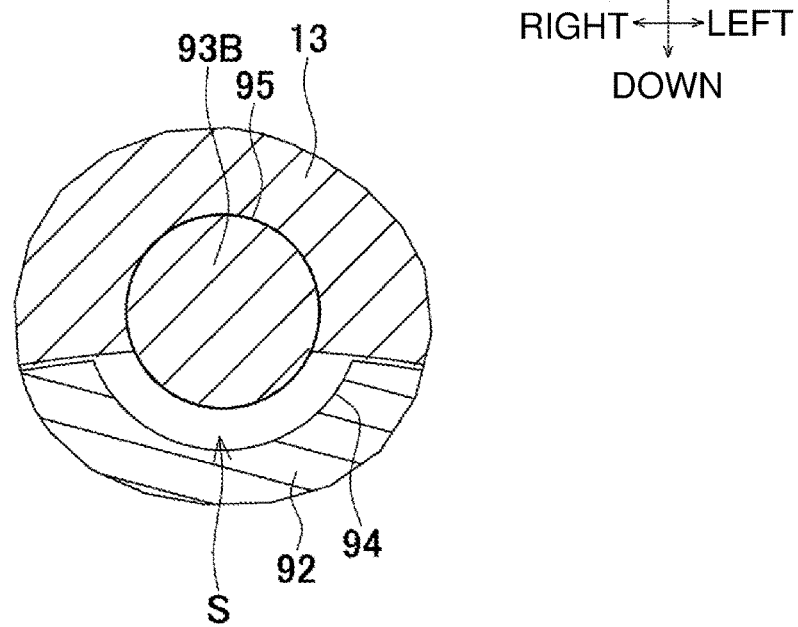
FIG. 6B is an enlarged view of area C.
Figure 7A:
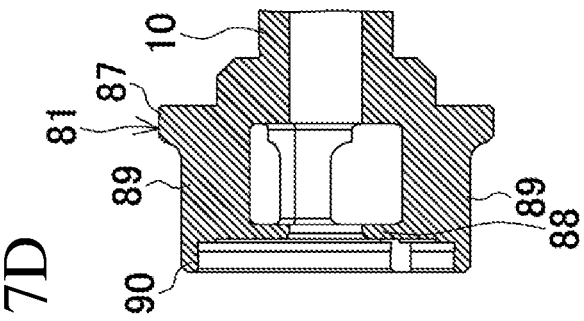
FIG. 7A is a rear view of a spindle.
Figure 7B:
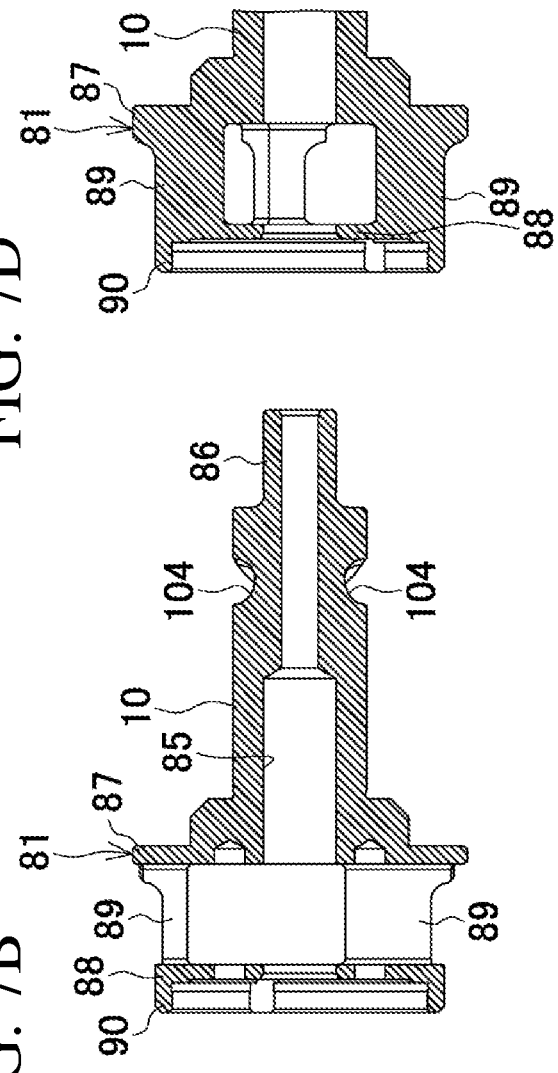
FIG. 7B is a cross-sectional view taken along line D-D in FIG. 7A.
Figure 7C:
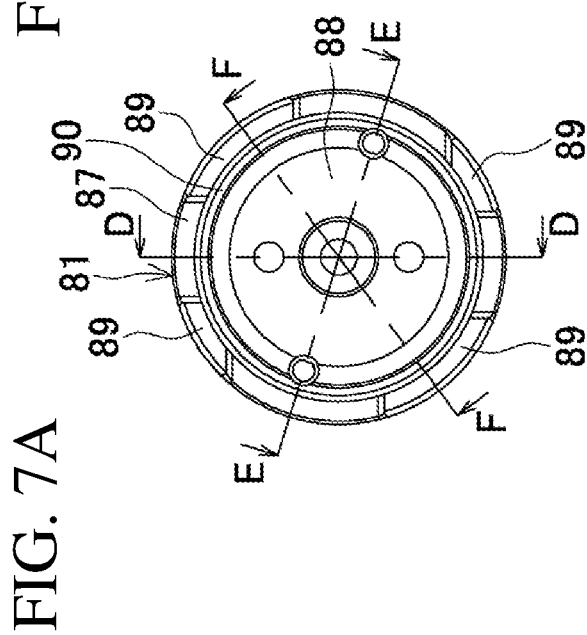
FIG. 7C is a cross-sectional view taken along line E-E in FIG. 7A.
Figure 7D:
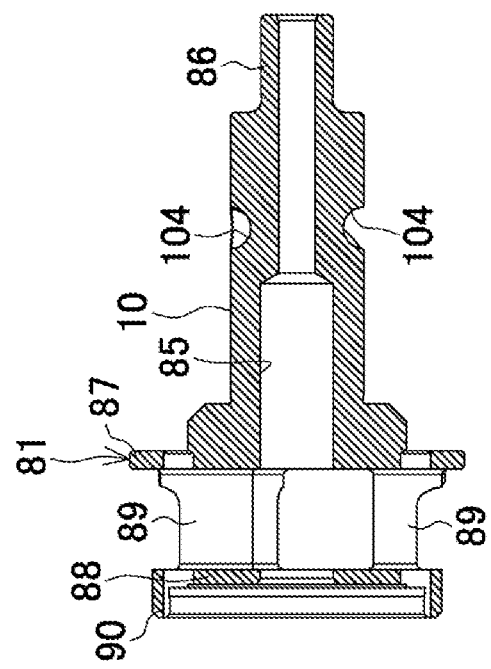
FIG. 7D is a cross-sectional view taken along line F-F in FIG. 7A.

The internal gear 92 is restricted from rotation by eight pins 93A and 93B (four pins 93A and four pins 93B). The eight pins 93A and 93B extend in the front-rear direction between the internal gear 92 and the gear case 13 at circumferentially equal intervals. The four pins 93A are columnar and formed from rubber. The four pins 93B are columnar and formed from iron (e.g., high carbon chromium bearing steels such as SUJ). As shown in FIGS. 6A and 6B, the pins 93A and 93B are alternately arranged circumferentially, and are each fitted in a first recess 94 and in a second recess 95. The first recesses 94 with a semicircular cross section are located on the outer surface of the internal gear 92. The second recesses 95 with a semicircular cross section are located on the inner surface of the gear case 13. The internal gear 92 is located radially outward from the rear plate 88.

A portion of the first recess 94 receiving each pin 93B has a cross section with a smaller arc than a semicircle, whereas a portion of the second recess 95 receiving each pin 93B has a cross section with a larger arc than a semicircle. The second recess 95 holds the pin 93B. The four first recesses 94 each receiving the pin 93B have an arc with a larger diameter than the outer diameter of the pin 93B. A space S is left between the first recess 94 and the pin 93B held in the second recess 95.

Thus, with the four rubber pins 93A elastically deformed, the internal gear 92 is slightly movable circumferentially within the range in which the four iron pins 93B each come in contact with the first recess 94. When the pins 93A are sheared (broken), the pins 93B coming in contact with the first recesses 94 can retain the internal gear 92 in a nonrotatable manner.

The striking mechanism 11 includes a hammer 100, balls 101, and a coil spring 102. The hammer 100 is externally mounted on the front portion of the spindle 10. The balls 101 are located between the hammer 100 and the spindle 10. The coil spring 102 urges the hammer 100 frontward. The hammer 100 has, on its front surface, a pair of tabs (not shown) that are rotationally engageable with a pair of arms 103 at the rear end of the anvil 4. The balls 101 are each fitted in a cam groove 104 on the outer peripheral surface of the spindle 10 and in a cam groove 104 on the inner peripheral surface of the hammer 100, allowing corotation of the spindle 10 and the hammer 100. The coil spring 102 is externally mounted on the spindle 10. The front end of the coil spring 102 is received in a ring groove 105 on the rear surface of the hammer 100. The rear end of the coil spring 102 abuts against the front surface of the carrier 81. In a normal state, the coil spring 102 urges the hammer 100 to an advanced position at which the tabs are engaged with the arms 103.

The anvil 4 is supported coaxially with the spindle 10 by a bearing metal 106 held by the front cylinder 22. The anvil 4 is positioned at the front with a regulation ring 107 between the front cylinder 22 and the arms 103. The anvil 4 has the axial insertion hole 108 at its rear end. The insertion hole 108 receives the smaller-diameter portion 86 of the spindle 10.

In front of the bearing metal 106, a seal ring 109 is located between the front cylinder 22 and the anvil 4. The anvil 4 has an attachment portion 110 at its front end. The attachment portion 110 has a rectangular cross section and receives a socket (not shown).

When the side handle 40 is attached to the front cylinder 22 via the second cover 28 in the impact wrench 1 according to the present embodiment, an operator can support the impact wrench 1 by holding the handle 3 with one hand and holding the grip 41 of the side handle 40 with the other hand. The grip 41 may extend in the laterally opposite direction, and may be tilted upward or downward, rather than extending sideward. In this case as well, the protrusions 43 and the recesses 37 are fitted to position the grip 41.

In this state, when the operator presses the trigger 46 with the hand holding the handle 3, the switch 45 is turned on, and the power of the battery pack 6 drives the brushless motor 8. More specifically, the microcomputer in the control circuit board 51 receives, from the rotation detection element in the sensor circuit board 66, a rotation detection signal indicating the positions of the permanent magnets 72 in the rotor 61, and determines the rotational state of the rotor 61. The microcomputer in the control circuit board 51 controls the on-off state of each switching element in accordance with the determined rotational state, and applies a current through the coils 65 in the stator 60 sequentially to rotate the rotor 61.

The rotation of the rotational shaft 70 allows the sun-and-planet motion of the planetary gears 82 in the carrier 81 about the sun gear 76, and then allows the sun-and-planet motion of the planetary gears 83 each meshing with the planetary gear 82 inside the internal gear 92. This allows the spindle 10 to rotate at lower speed, causing the hammer 100 to rotate with the balls 101. Thus, the anvil 4 engaged with the hammer 100 also rotates, allowing tightening of, for example, a bolt with the socket. Turning on the switch 45 allows the control circuit board 51 to turn on the light source 49 to illuminate the front of the socket and to turn on the second light source 53 to illuminate the socket from below.

When the bolt is tightened more firmly and the torque of the anvil 4 increases, the hammer 100 retracts while rolling the balls 101 rearward along the corresponding cam grooves 104 against the urging force from the coil spring 102. When the tabs are disengaged from the arms 103, the hammer 100 advances while rotating by rolling the balls 101 frontward along the corresponding cam grooves 104 under the urging force from the coil spring 102. Then, the tabs are re-engaged with the arms 103 to cause the anvil 4 to generate a rotational impact force (impact). The impact is intermittently generated repeatedly, tightening the bolt more firmly.

When the anvil 4 receives shock from an abnormal impact force, the repulsive force from the anvil 4 impulsively pushes the hammer 100 back to the rear ends of the cam grooves 104 in the spindle 10. In this state, the shock may be transmitted to the planetary gears 82 and 83 in the spindle 10 and the internal gear 92. The internal gear 92, which is held by the rubber pins 93A, is rotated circumferentially by the elastic deformation of the pins 93A to absorb the shock. This structure reduces shock on the planetary gears 82 and 83 and the internal gear 92.

The impact wrench 1 according to the present embodiment includes the brushless motor (motor) 8, the anvil (output shaft) 4 driven by the brushless motor 8, the hammer case (case) 9 accommodating a part of the anvil 4, the first cover 27 covering a part of the hammer case 9, and the second cover 28 covering another part of the hammer case 9. The side handle 40 is attachable to the second cover 28. The side handle 40 is attachable or detachable without attaching or detaching the second cover 28 to or from the front cylinder 22. This facilitates the attachment of the side handle 40, and prevents the second cover 28 from being lost.

In particular, the first cover 27 is formed from rubber, and the second cover 28 is formed from a resin and located in front of the first cover 27. The first cover 27 and the second cover 28 can thus reliably protect a workpiece that comes in contact with the hammer case 9, and prevents the side handle 40 attached to the second cover 28 from rattling and improves durability.

The first cover 27 is positioned through engagement with the rear stopper (positioning unit) 23A protruding on the outer surface of the hammer case 9. The second cover 28 is positioned through engagement with the rear stopper (positioning unit) 23B and the front stopper (positioning unit) 25 protruding on the outer surface of the hammer case 9. Thus, the first cover 27 and the second cover 28 are easily attachable, and are less likely to rattle or be misaligned once attached.

Although the first cover is formed from rubber and the second cover is formed from a resin in the present embodiment, both the covers may be formed from rubber or from a resin.

The structure for engagement with the hammer case may be modified as appropriate. For example, the first cover may have more positioning units or the second cover may have fewer positioning units. The division of the cover is not limited to the structure described in the above embodiment, and may be modified in design as appropriate. For example, the first cover may be longer, the second cover may be longer, or both the covers have their end faces overlapping each other. The first cover may entirely cover the rear portion of the hammer case.

The impact wrench 1 according to the present embodiment includes the brushless motor (motor) 8, the anvil (output shaft) 4 driven by the brushless motor 8, the hammer case (case) 9 accommodating a part of the anvil 4, and the second cover (cover) 28, which is formed from a resin, covering a part of the hammer case 9 and fixed with the ring spring (elastic member) 38. The side handle 40 is attachable to the second cover 28. The side handle 40 can thus be attachable or detachable without attaching or detaching the second cover 28 to or from the front cylinder 22. This facilitates the attachment of the side handle 40, and prevents the second cover 28 from being lost. Further, the second cover 28 is fixed with the ring spring 38. The attached side handle 40 is thus less likely to rattle.

In particular, the hammer case 9 and the second cover 28 are cylindrical, and the ring spring (elastic member) 38 is externally wound around the second cover 28. The second cover 28, which is formed from a resin, can thus be reliably fixed with the ring spring 38.

The first cover (rubber cover) 27 covers a part of the hammer case 9 behind the second cover 28. The first cover 27 and the second cover 28 thus protect a workpiece that comes in contact with the hammer case 9.

More ring springs may be used, or the ring spring may have another shape (front-rear dimension and thickness). The ring spring may be located at the front or rear end of the second cover, rather than in the middle. The elastic member may be a coil spring or a circlip, rather than a ring spring.

The impact wrench 1 according to the present embodiment includes the brushless motor (motor) 8, the sun gear 76 rotatable by the brushless motor 8, the planetary gears 82 and 83 meshing with the sun gear 76, the internal gear 92 meshing with the planetary gears 83, the gear case 13 holding the internal gear 92, the spindle 10 holding the planetary gears 82 and 83, and the bearing (first bearing) 91 located between the gear case 13 and the spindle 10. The bearing 91 supports the spindle 10 on its outer circumference and the gear case 13 on its inner circumference. This structure eliminates the need to hold the rear end of the spindle 10 on the outer circumference. The bearing 91 can be smaller, thus allowing radially compact design.

In particular, the gear case 13 includes the bearing holder (inner support) 74 supported on the inner circumference of the bearing 91. The spindle 10 includes the outer support 90 supported on the outer circumference of the bearing 91. The bearing holder 74 and the outer support 90 overlap each other in the radial direction of the spindle 10. The spindle 10 including the outer support 90 does not extend long frontward, thus maintaining axially compact design.

The gear case 13 holds the bearing (second bearing) 75 axially supporting the rotational shaft 70. The first bearing 91 is located radially outward from the second bearing 75, and radially overlaps the second bearing 75. The spindle 10 can thus be axially smaller although the first bearing 91 is located behind the internal gear 92.

The bearing is not limited to a ball bearing, but may be, for example, a needle bearing, or a bearing metal. A plurality of bearings may be located in the axial direction.

The structure of the outer support of the spindle is not limited to the structure described in the above embodiment and may be modified as appropriate. For example, the outer support may have a smaller diameter than the carrier, or may not be a ring but may include arc-shaped walls arranged on the same circle.

Figure 8:
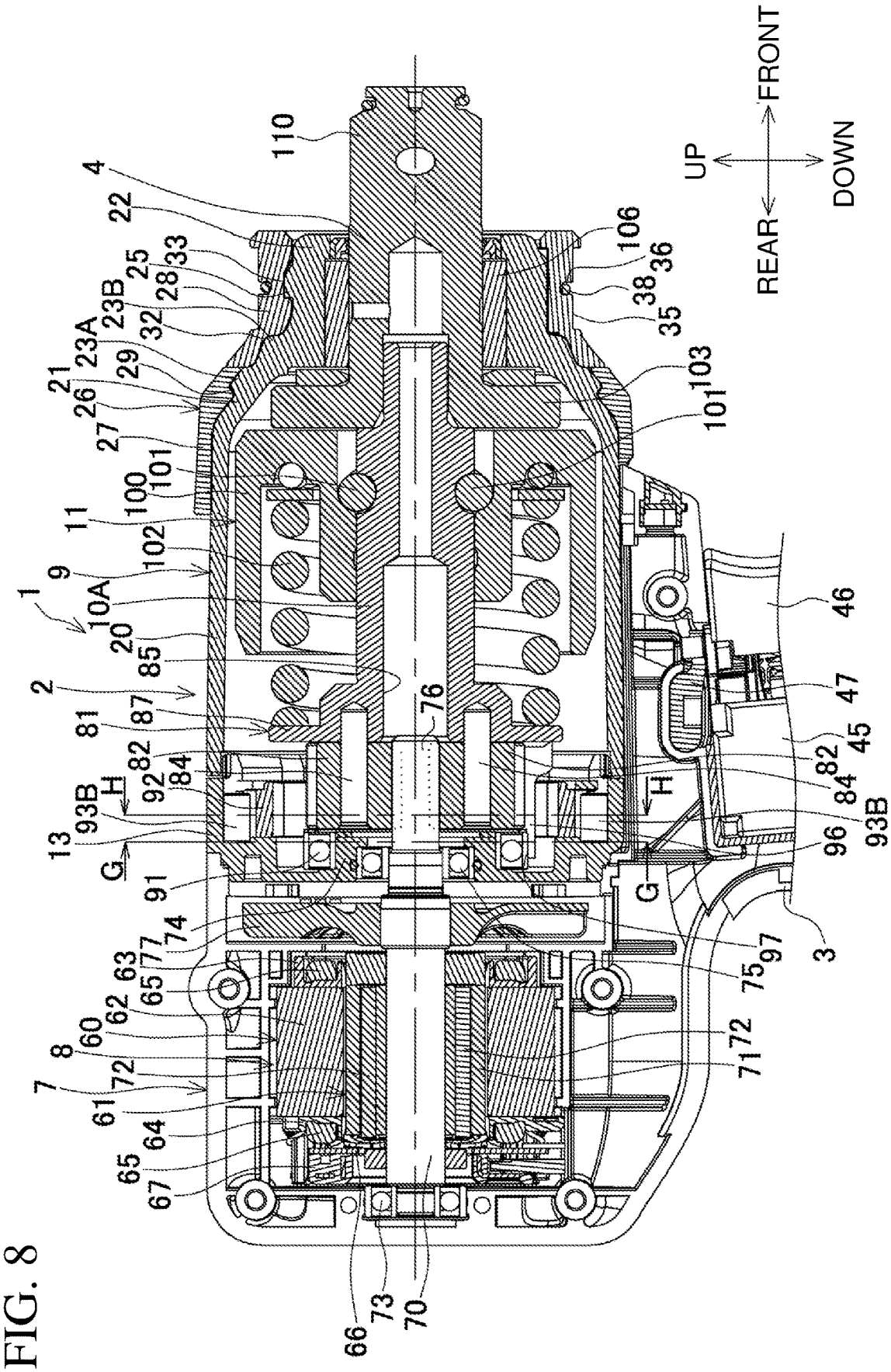
FIG. 8 is an enlarged sectional view of a body of an impact wrench according to a modification.
Figure 9:
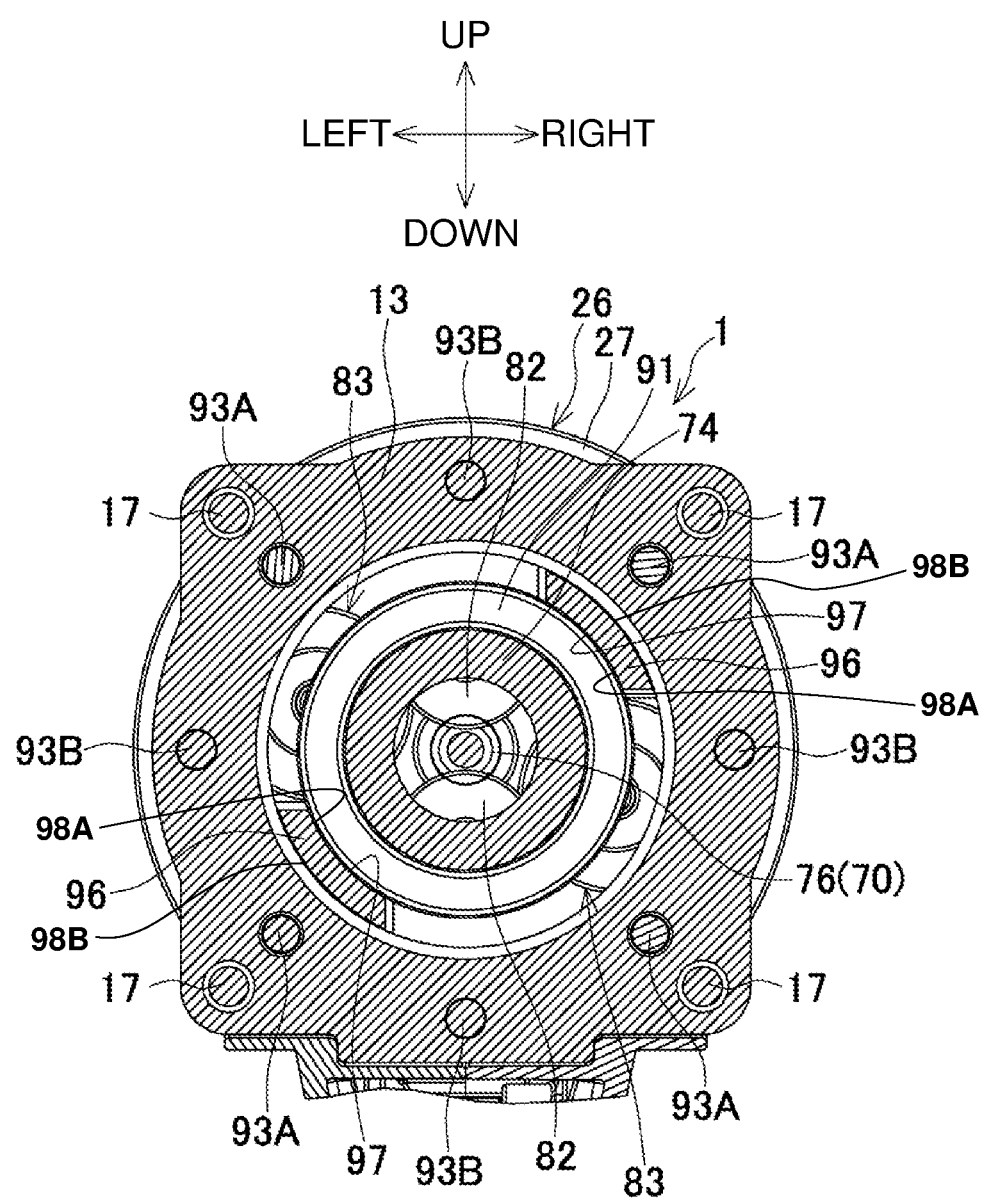
FIG. 9 is a cross-sectional view taken along line G-G in FIG. 8.
Figure 10:
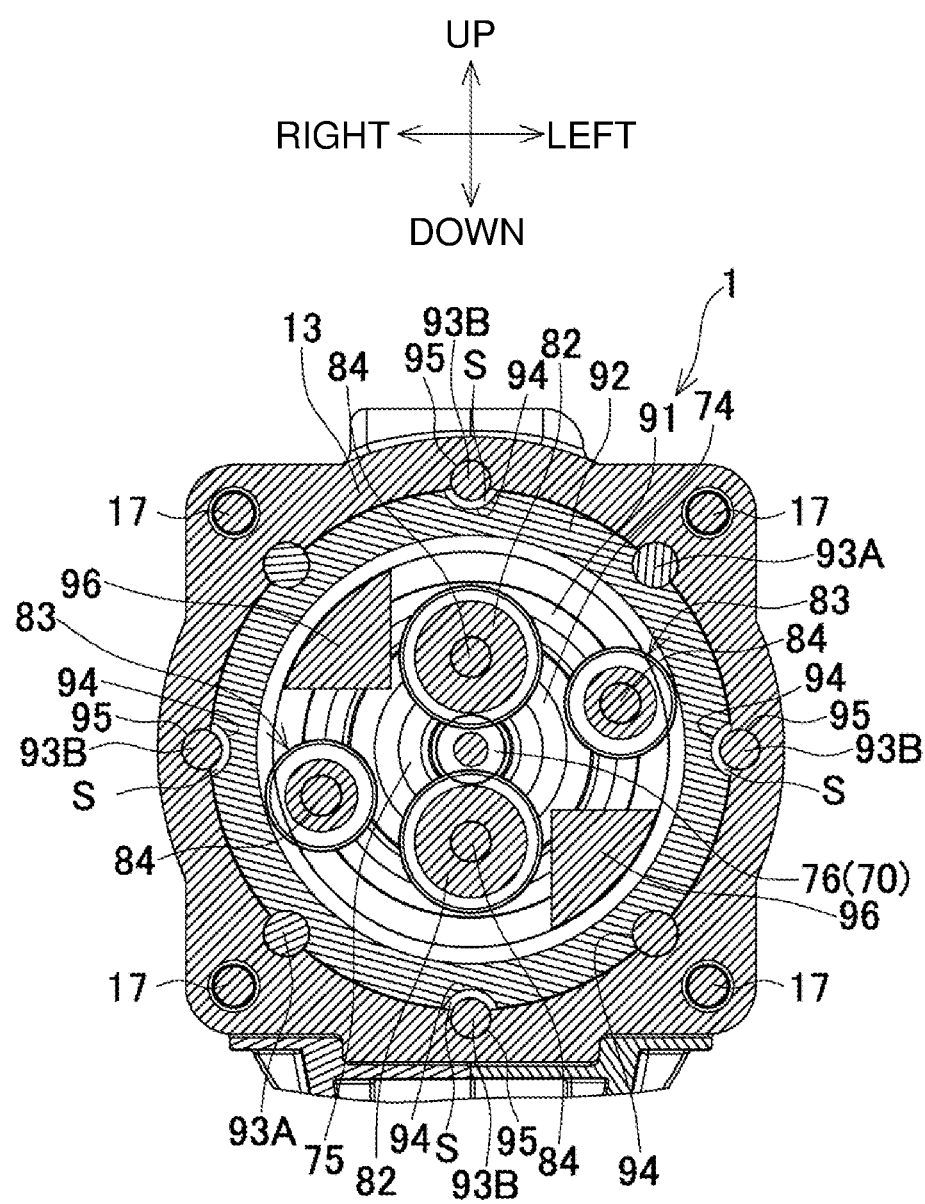
FIG. 10 is a cross-sectional view taken along line H-H in FIG. 8.
Figure 11D:
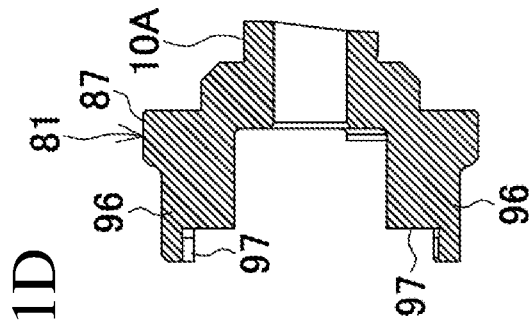
FIG. 11D is a cross-sectional view taken along line K-K in FIG. 11A.
Figure 11B:
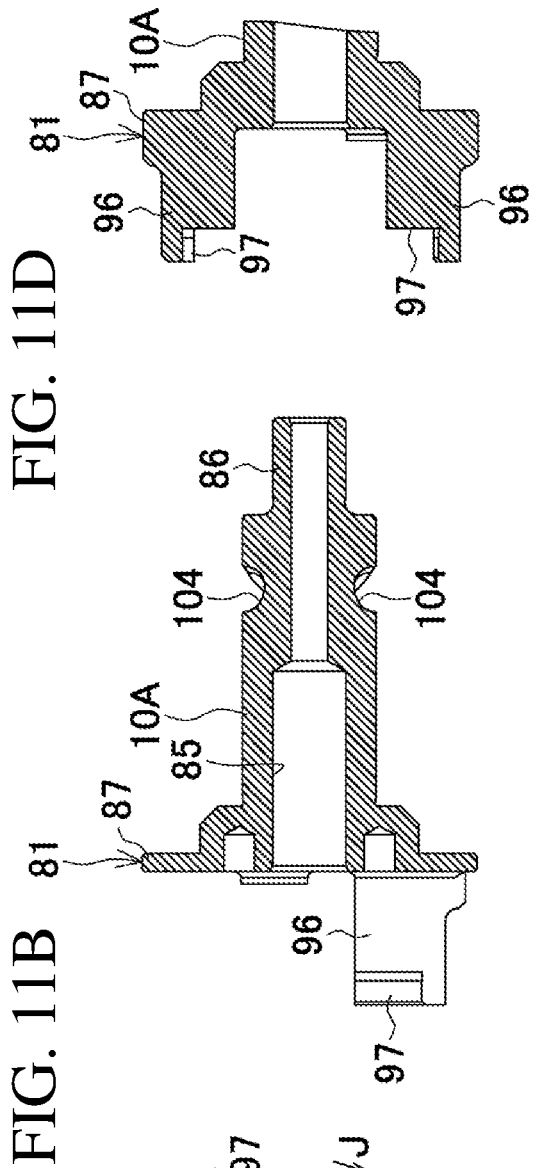
FIG. 11B is a cross-sectional view taken along line I-I in FIG. 11A.
Figure 11C:
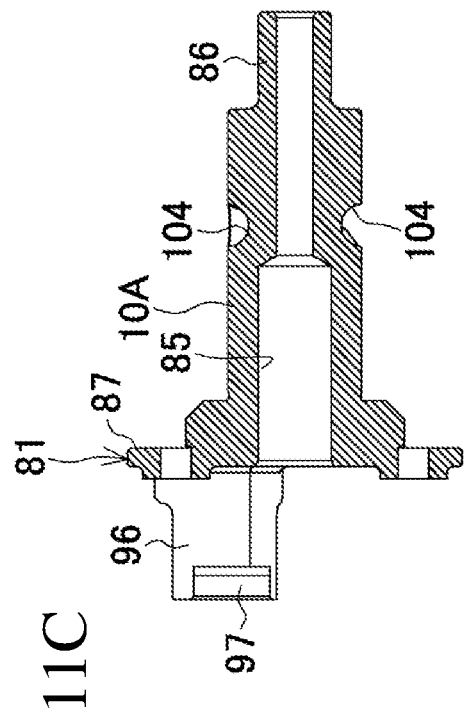
FIG. 11C is a cross-sectional view taken along line J-J in FIG. 11A.
Figure 11A:
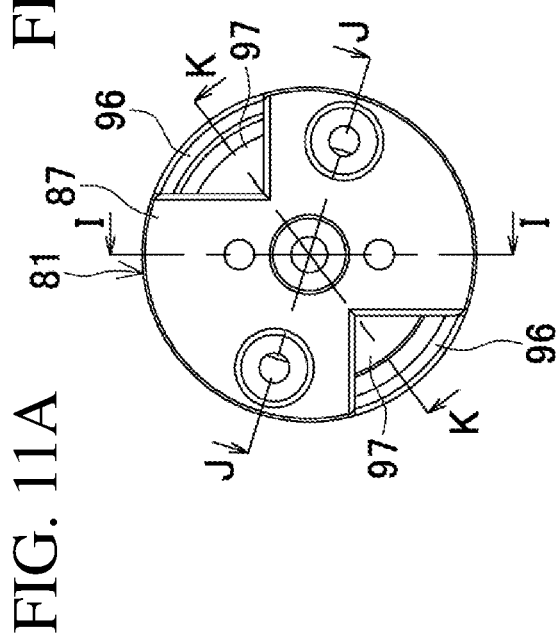
FIG. 11A is a rear view of a spindle according to the modification.

FIG. 8 shows another structure in which the bearing axially supports the gear case and a spindle. The same components as in the above embodiment are given the same reference numerals and will not be described repeatedly, and the components different from those in the above embodiment will be described.

In an impact wrench 1 shown in FIG. 8 according to a modification, a carrier 81 of a spindle 10A includes no rear plate and no connector. As shown in FIGS. 9 to 11D, a pair of protruding portions 96 integral with and protruding rearward from the front plate 87 are located at two points that are symmetric to each other on the same circle about the axis of the spindle 10A. A bearing 91 is held by holding recesses 97 on the inner rear ends of the protruding portions 96. Thus, the front plate 87 simply supports the front ends of the support pins 84 in a cantilevered manner. The protruding portions 96 each have a peripherally recessed portion 98A along their inner periphery. The protruding portions 96 each have a peripherally convexed portion 98B along their outer periphery.

The impact wrench 1 according to the modification includes the brushless motor (motor) 8, the sun gear 76 rotatable by the brushless motor 8, the planetary gears 82 and 83 meshing with the sun gear 76, the internal gear 92 meshing with the planetary gears 83, the gear case 13 holding the internal gear 92, the spindle 10A holding the planetary gears 82 and 83, and the bearing 91 located between the gear case 13 and the spindle 10A. The spindle 10A has the pair of protruding portions 96 protruding toward the bearing 91. The bearing 91 is located inside the protruding portions 96. This structure thus eliminates the need to hold the rear end of the spindle 10A on the outer circumference, and thus allows the bearing 91 to be smaller. This allows radially compact design.

The number of protruding portions and their shapes are not limited to those described in the above embodiment and may be changed as appropriate. Three or more protruding portions may be provided in accordance with the specifications of the gears.

The impact wrench 1 according to the present embodiment includes the brushless motor (motor) 8, the sun gear 76 rotatable by the brushless motor 8, the planetary gears 82 and 83 meshing with the sun gear 76, the internal gear 92 meshing with the planetary gears 83, the gear case 13 holding the internal gear 92, and the spindle 10 holding the planetary gears 82 and 83. The internal gear 92 has the first recesses 94 on its outer circumference. The gear case 13 has the second recesses 95 on its inner circumference. The pins 93A, which are each fitted in the first and second recesses 94 and 95, reduce shock received by the spindle 10 from, for example, an abnormal impact force. This structure reduces the likelihood of the planetary gears 82 and 83 and the internal gear 92 being damaged, and improves the durability of the reduction mechanism.

In particular, the four first recesses 94 each receiving the iron pin 93B are larger than the portion of the pin 93B received in the first recess 94, providing the internal gear 92 with a clearance for allowing circumferential movement.

This structure effectively releases shock in the circumferential direction of the internal gear 92.

The pins 93A are elastically deformable, and thus effectively reduce circumferential shock.

The elastically deformable pins 93A and the elastically undeformable pins 93B are used. The pins 93B can retain the internal gear 92 in a nonrotatable manner when the pins 93A are broken.

The number of pins (the number of first and second recesses) is not limited to that described in the above embodiment, and may be increased or decreased. The pins may have any shape other than a columnar shape. Although the iron pins are held in the second recesses on the gear case in the present embodiment, the pins may be held in the first recesses on the internal gear reversely. In this case, the spaces are left in the second recesses. Although the spaces may be left for all the pins rather than for the selected pins (four pins), the rubber pins may each come in contact with the recess earlier than the iron pins. The spaces may be eliminated.

When the pins and the recesses are shaped to reduce shock, the pins may be formed from a material other than an elastic material, such as rubber. For example, all the pins may be elastically undeformable pins, such as iron pins, or elastically deformable pins.

The power tool is not limited to an impact wrench, but may be, for example, an impact driver, a screwdriver, a hammer, or a hammer drill.

The power tool may be any other power tool including a reduction mechanism using a planetary gear, such as an impact driver and a screwdriver other than an impact wrench. The internal gear may have a reduction mechanism with multiple stages.

The planetary gears may not be two-stage gears as in the above embodiment, but all the planetary gears supported by the single carrier may mesh with the internal gear. The power tool may include a motor different from a blushless motor, or may use an alternating current.

REFERENCE SIGNS LIST

1 impact wrench
2 body
3 handle
4 anvil
5 battery mount
6 battery pack
7 body housing
8 brushless motor
9 hammer case
10, 10A spindle
11 striking mechanism
13 gear case
20 case body
21 tapered portion
22 front cylinder
23A, 23B rear stopper
25 front stopper
26 cover
27 first cover
28 second cover
29 engagement groove
32 rear positioning groove
33 front positioning groove
35 fitting groove
38 ring spring
40 side handle
41 grip
42 clamp
45 switch
50 controller
60 stator
61 rotor
70 rotational shaft
74 bearing holder
73, 75, 91 bearing
76 sun gear
81 carrier
82, 83 planetary gear
84 support pin
90 outer support
92 internal gear
93A, 93B pin
94 first recess
95 second recess
96 protruding portion
97 holding recess
100 hammer
S space

What is claimed is:

1. A power tool, comprising:
   a motor that includes a rotational shaft;
   a sun gear rotatable by the motor;
   a planetary gear meshing with the sun gear;
   an internal gear meshing with the planetary gear;
   a gear case holding the internal gear;
   a spindle holding the planetary gear;
   a first bearing located between the gear case and the spindle, the first bearing supporting the spindle on an outer circumference and the gear case on an inner circumference; and
   a second bearing axially supporting the rotational shaft; wherein:
   the gear case holds the second bearing; and
   the first bearing is located radially outward from the second bearing and radially overlaps the second bearing.

2. The power tool according to claim 1, wherein
   the gear case includes an inner support supported on the inner circumference of the first bearing,
   the spindle includes an outer support supported on the outer circumference of the first bearing, and
   the inner support and the outer support overlap each other in a radial direction of the spindle.

3. The power tool according to claim 2, wherein
   the outer support holds the first bearing along an entire periphery.

4. The power tool according to claim 2, wherein
   the spindle includes a rear plate having the outer support protruding on an outer circumference, and
   the internal gear is located radially outward from the rear plate.

5. The power tool according to claim 4, wherein
   the spindle has two protruding portions protruding rearward and each having a holding recess on an inner rear end of the protruding portion, and
   the first bearing is held by the two holding recesses.

6. The power tool according to claim 5, wherein
   the spindle includes a front plate, and
   the protruding portions are integral with the front plate.

7. The power tool according to claim 5, wherein
   the protruding portions extend from the front plate in a cantilevered manner.

8. The power tool according to claim 3, wherein
the spindle includes a rear plate having the outer support protruding on an outer circumference, and
the internal gear is located radially outward from the rear plate.

9. The power tool according to claim 6, wherein
the protruding portions extend from the front plate in a cantilevered manner.

* * * * *